United States Patent
Hayashi et al.

(10) Patent No.: US 7,474,490 B2
(45) Date of Patent: Jan. 6, 2009

(54) DISK DRIVE WITH REDUCED VIBRATION DUE TO ROTATIONAL ACCELERATION OF A SPINDLE MOTOR

(75) Inventors: Yukiko Hayashi, Kanagawa (JP); Isao Yoneda, Kanagawa (JP); Gaku Ikedo, Kanagawa (JP); Nobuhisa Koide, Kanagawa (JP); Yuhji Amari, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 0 days.

(21) Appl. No.: 11/796,255

(22) Filed: Apr. 26, 2007

(65) Prior Publication Data

US 2007/0253089 A1 Nov. 1, 2007

(51) Int. Cl.
*G11B 15/46* (2006.01)
*G11B 15/18* (2006.01)
(52) U.S. Cl. .............. 360/73.03; 360/69; 369/53.18
(58) Field of Classification Search .......... None
See application file for complete search history.

(56) References Cited

U.S. PATENT DOCUMENTS

| | | | |
|---|---|---|---|
| 6,373,801 B2* | 4/2002 | Ichikawa | 369/53.18 |
| 6,753,667 B2 | 6/2004 | Sakamoto | |
| 6,963,463 B2 | 11/2005 | Sri-Jayantha et al. | |

FOREIGN PATENT DOCUMENTS

| | | |
|---|---|---|
| JP | 06-325554 | 11/1994 |
| JP | 10-172231 | 6/1998 |
| JP | 2002-300793 | 10/2002 |
| JP | 2003-224988 | 8/2003 |

* cited by examiner

*Primary Examiner*—Andrew L. Sniezek
(74) *Attorney, Agent, or Firm*—Townsend and Townsend and Crew LLP; John Henkhaus

(57) ABSTRACT

Embodiments in accordance with the present invention provide a disk drive that ensures quieter rotational acceleration of a recording disk. Certain embodiments relate to a hard disk drive that detects the vibration of an enclosure by monitoring, via a driver, a counter electromotive voltage generated in a voice coil motor. If the hard disk drive detects a predetermined level of vibration or higher in the enclosure, it switches the status of a drive signal applied to a spindle motor so as to reduce the current level or smooth the waveform. This ensures reduced vibration of the enclosure.

5 Claims, 10 Drawing Sheets

DISK DRIVE WITH REDUCED VIBRATION DUE TO ROTATIONAL ACCELERATION OF A SPINDLE MOTOR

CROSS-REFERENCE TO RELATED APPLICATION

The instant nonprovisional patent application claims priority to Japanese Application No. 2006-122692, filed Apr. 26, 2006 and incorporated by reference in its entirety herein for all purposes.

BACKGROUND OF THE INVENTION

Recent years have seen the application of disk drives such as hard disk drives, not only to computers, but also to other areas including home electronic appliances. As a result, quietness during operation of the hard disk drive is increasingly being demanded.

Incidentally, disk drives are liable to generate noise particularly due to the vibration caused by the rotation of a spindle motor during the rotational acceleration (during so-called spinup) caused by the fact that the recording disk is accelerated from a standstill to a predetermined rotational speed by the spindle motor. More specifically, when the recording disk begins to rotate from a standstill, friction acting on a rotation mechanism changes. This leads to unstable rotation, thus resulting in a greater likelihood of noise generation. Further, in a certain rotational speed range, the vibration caused by the spindle motor rotation produces a structural resonance in the disk drive, resulting in a greater likelihood of noise generation.

Japanese Laid-Open Patent No. 1998-172231 ("Patent Document 1") discloses a technique of generating a rotational frequency waveform of a spindle and controlling the spindle rotation in response to the rotational speed obtained from the generated waveform. On the other hand, Japanese Laid-Open Patent No. 2002-300793 ("Patent Document 2") discloses a technique of changing the spindle drive control when priority is given to low noise. However, no mention is made with respect to measures to make spinup quieter.

BRIEF SUMMARY OF THE INVENTION

Embodiments of the present invention provide a disk drive that ensures quieter rotational acceleration of a recording disk. According to the particular embodiments disclosed in FIGS. 1 and 2, a hard disk drive 1A detects the vibration of an enclosure 2 by monitoring via a driver 72 a counter electromotive voltage generated in a voice coil motor VCM. If the hard disk drive 1A detects a predetermined level of vibration or higher in the enclosure 2, it switches the status of a drive signal applied to a spindle motor SPM so as to reduce the current level or smooth the waveform. This ensures reduced vibration of the enclosure 2.

BRIEF DESCRIPTION OF THE DRAWINGS

FIG. 10 is an explanatory view of the step-by-step switching of a drive signal in the third operating condition.

FIG. 11 is a graph schematically showing the change over time of the vibration occurring in an enclosure during spinup.

DETAILED DESCRIPTION OF THE INVENTION

Figure 1:
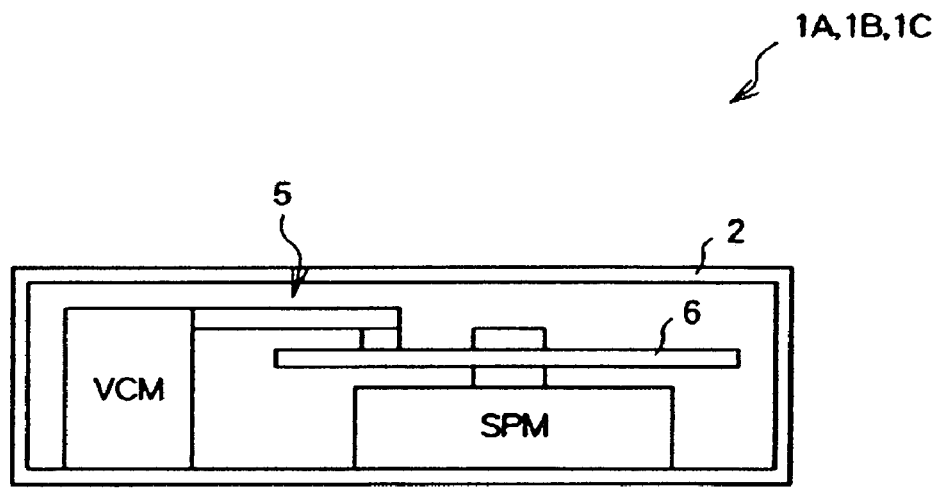
FIG. 1 is a view schematically showing the sectional structure of a hard disk drive.

Embodiments in accordance with the present invention relate to a disk drives such as hard disk drives. Embodiments in accordance with the present invention have been made in light of the above problems, and it is an object of embodiments of the invention to provide a disk drive that ensures quieter rotational acceleration of a recording disk.

To solve the above problems, a disk drive according to embodiments of the present invention includes a spindle motor adapted to rotate a recording disk and a detecting device adapted to detect the vibration of an enclosure. The disk drive also includes a control device adapted to switch the status of a drive signal applied to the spindle motor so as to reduce the vibration of the enclosure if the detecting device detects a predetermined level of vibration or higher during the rotational acceleration of the recording disk.

According to an embodiment of a disk drive of the present invention, the detecting device detects the vibration of the enclosure by monitoring a counter electromotive voltage generated in a motor different from the spindle motor included in the enclosure.

According to an embodiment of a disk drive of the present invention, the control device reduces the current level of the drive signal applied to the spindle motor.

According to an embodiment of a disk drive of the present invention, the control device smoothes the waveform of the drive signal applied to the spindle motor.

Further, a disk drive according to embodiments of the present invention includes a spindle motor adapted to rotate a recording disk and a storage device adapted to store a rotational speed range causing a predetermined level of vibration or higher in the enclosure. The disk drive also includes a control device adapted to switch the status of a drive signal applied to the spindle motor so as to reduce the vibration of the enclosure if the rotational speed of the spindle motor falls within the rotational speed range during the rotational acceleration of the recording disk.

The disk drive according to embodiments of the present invention includes a detecting device adapted to detect the vibration of an enclosure. The rotational speed range stored in the storage device is updated if the detecting device detects a predetermined level of vibration or higher.

A disk drive according to embodiments of the present invention applies a drive signal to a spindle motor in such a manner as to prevent the vibration of an enclosure from reaching a predetermined level or higher during the rotational acceleration of a recording disk. This ensures quieter rotational acceleration of the recording disk.

Embodiments of a disk drive in accordance with the present invention will be described below with reference to the accompanying drawings. It is to be noted that while application of the present invention to hard disk drive will be described, the present invention is not limited thereto and may be applied to other types of disk drives such as optical disk drive.

The configuration of a disk drive according to embodiments of the present invention will be described. FIG. 1 is a schematic diagram of the sectional structure of a hard disk drive 1 (1A, 1B, 1C) according to first to third embodiments. The hard disk drive 1 incorporates a magnetic recording disk 6, a spindle motor SPM, a magnetic head assembly 5 and a voice coil motor VCM in an enclosure 2.

The magnetic recording disk 6 has a recording area on the surface thereof. A magnetic head provided at the tip of the magnetic head assembly 5 reads and writes data. The magnetic head assembly 5 is supported rotatably. The magnetic head moves along the diameter of the magnetic recording disk 6 as the magnetic head assembly 5 is rotated and driven by the voice coil motor VCM. On the other hand, the magnetic recording disk 6 is rotated and driven by the spindle motor SPM that includes, for example, a DC brushless motor.

Figure 2:
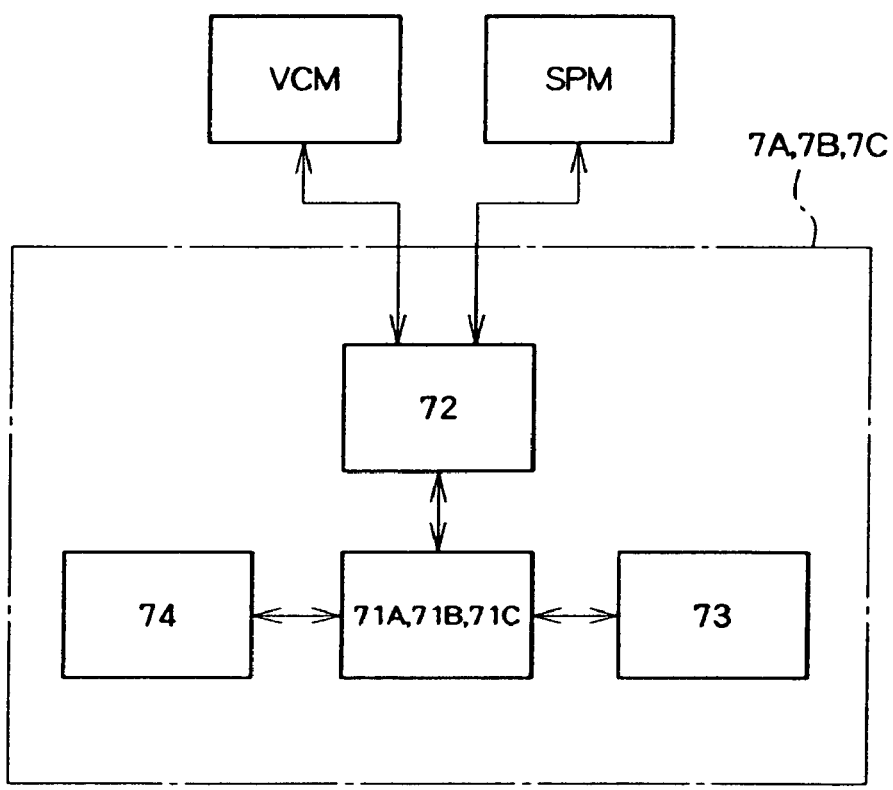
FIG. 2 is a block diagram showing the configuration of a control device adapted to control the operation of the hard disk drive.

FIG. 2 is a block diagram showing the configuration of a control device 7 (7A, 7B, 7C) adapted to control the operation of the hard disk drive 1. The control device 7 is provided on the outside or inside of the enclosure 2. The control device 7 includes a processing unit 71 (71A, 71B, 71C), a driver 72, a memory 73 and an amplifier 74.

The processing unit 71 includes a CPU and other components. The memory 73 has a flash ROM that stores programs and data required for the operation of the processing unit 71, a RAM that serves as a work memory for the processing unit 71 and other components.

The driver 72 controls the drive of the voice coil motor VCM and the spindle motor SPM in response to instructions from the processing unit 71.

The amplifier 74 amplifies input signal from the processing unit 71 and outputs amplified signal to the magnetic head. Further, the amplifier 74 amplifies output signal from the magnetic head and outputs amplified signal to the processing unit 71.

The processing unit 71 outputs input data from a host and controls the driver 72 so as to move the magnetic head to the data write position. Further, the processing unit 71 controls the driver 72 so as to move the magnetic head to the data read position and outputs data from the amplifier 74 to the host.

The operation of the disk drive according to embodiments of the present invention will be described below. It is to be noted that although sharing the same configuration as described above, the hard disk drives 1A, 1B and 1C according to the first to third embodiments differ from each other in operation. That is, the programs adapted to operate the processing units 71A, 71B and 71C respectively in the control devices 7A, 7B and 7C are different from each other.

FIG. 11 is a graph schematically showing the change over time of the vibration occurring in the enclosure 2 during the rotational acceleration (during so-called spinup) caused by the fact that the recording disk 6 is accelerated from a standstill to a predetermined rotational speed by the spindle motor SPM, assuming that the process described later is not carried out.

More specifically, when the recording disk 6 begins to rotate from a standstill (near P1), friction acting between the disk and the spindle motor SPM changes. This leads to unstable rotation, thus resulting in a larger vibration as compared to other ranges. On the other hand, as the rotational speed reaches a certain range (near P2), the vibration caused by the rotation of the spindle motor SPM produces a structural resonance in the enclosure 2, resulting in a larger vibration as compared to other ranges. These large vibrations produce noise.

For this reason, the hard disk drives 1A, 1B and 1C of the first to third embodiments carry out processes to reduce a large vibration occurring during spinup of the recording disk 6 to ensure quieter spinup. Here, the processes for reducing the vibration carried out by the hard disk drives 1A, 1B and 1C of the first to third embodiments are different from each other. Each of the processes will be described below.

First Embodiment

Figure 3:
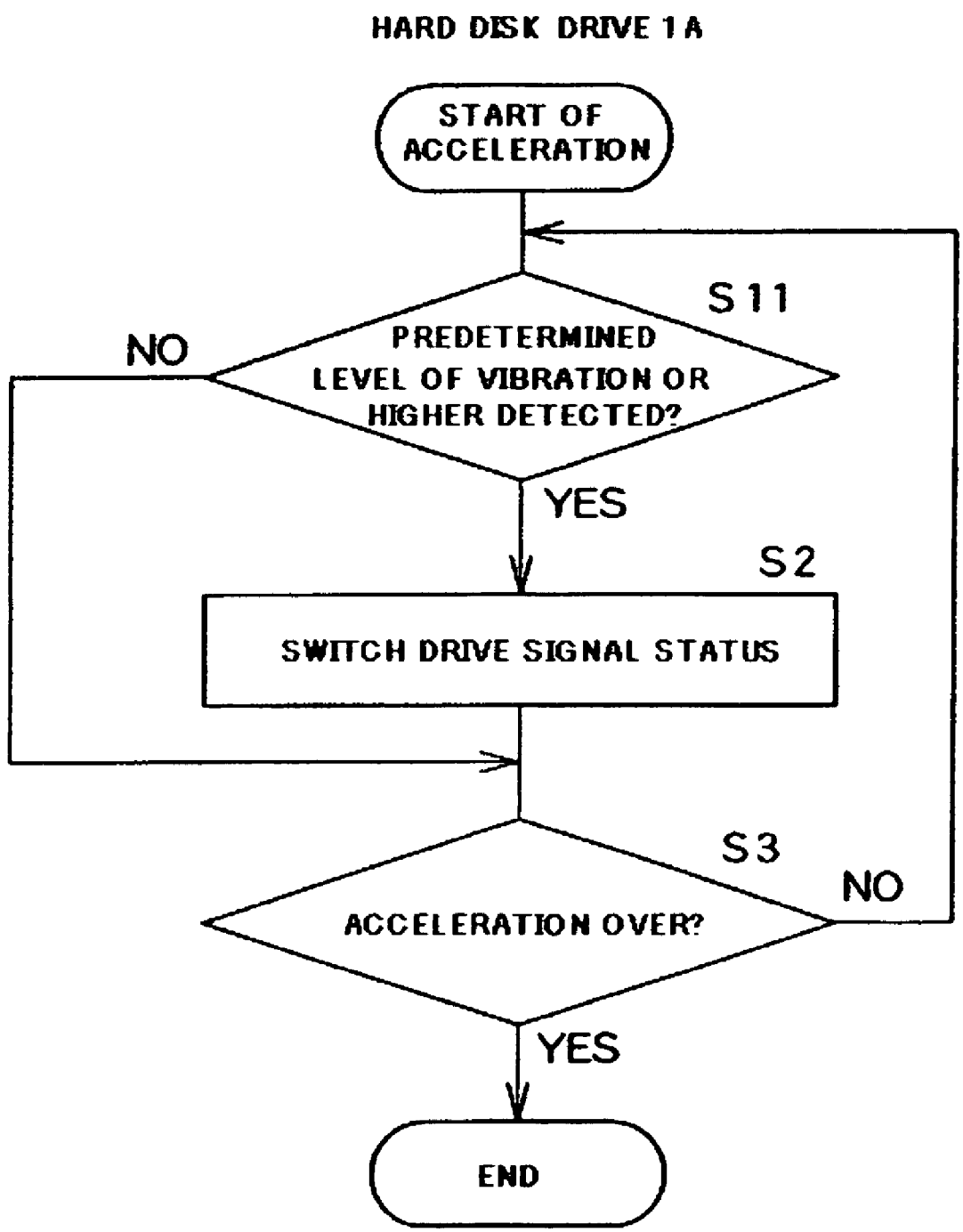
FIG. 3 is a flowchart showing the operation of the hard disk drive according to an embodiment of the present invention.

FIG. 3 shows a flowchart representing the operation of the hard disk drive 1A of the first embodiment. When the processing unit 71A of the control device 7A detects via the driver 72, a predetermined level of vibration or higher in the enclosure 2 (S11: YES), the processing unit switches the status of a drive signal applied to the spindle motor SPM so as to reduce the vibration of the enclosure 2 (S2). Here, the vibration level used as a threshold value can be determined as appropriate in accordance with the silence level required.

In Step S11, the vibration of the enclosure 2 can be detected by monitoring a counter electromotive voltage generated in a motor different from the spindle motor SPM housed in the enclosure. Here, the counter electromotive voltage generated in the voice coil motor VCM is monitored by the driver 72. That is, the driver 72 serves as a detecting device.

That is, if the enclosure 2 vibrates as a result of the rotation of the spindle motor SPM, the voice coil motor VCM housed in the enclosure also vibrates. This vibration affects the counter electromotive voltage generated in the voice coil motor VCM. Therefore, monitoring the counter electromotive voltage allows for detection of the vibration level of the enclosure 2.

On the other hand, the processing unit 71A may be designed to find the rate of change of the vibration of the enclosure 2 from a plurality of sample points of the counter electromotive voltage monitored, so as to detect in advance from the rate of change that the vibration will reach the predetermined level or higher.

It is to be noted that the first embodiment is not limited to the above arrangement where the vibration level of the enclosure 2 is detected by monitoring the counter electromotive voltage generated in the voice coil motor VCM. Instead, a vibration sensor may be separately provided as a detecting device to detect the vibration of the enclosure 2 so that the detected vibration is input to the processing unit 71A.

Next, a description will be made of the switching of the status of the drive signal applied to the spindle motor SPM. Here, the vibration of the enclosure 2 is reduced, for example, by reducing the current level or smoothing the waveform of the drive signal applied to the spindle motor SPM.

More specifically, the status of the drive signal applied to the spindle motor SPM is switched in a different manner in response to the operating condition of the spindle motor SPM, such as rotational speed. The switching of the drive signal status can be achieved, for example, by storing drive signal parameters to be switched in advance and causing the processing unit 71A to apply the parameters.

Figure 6:
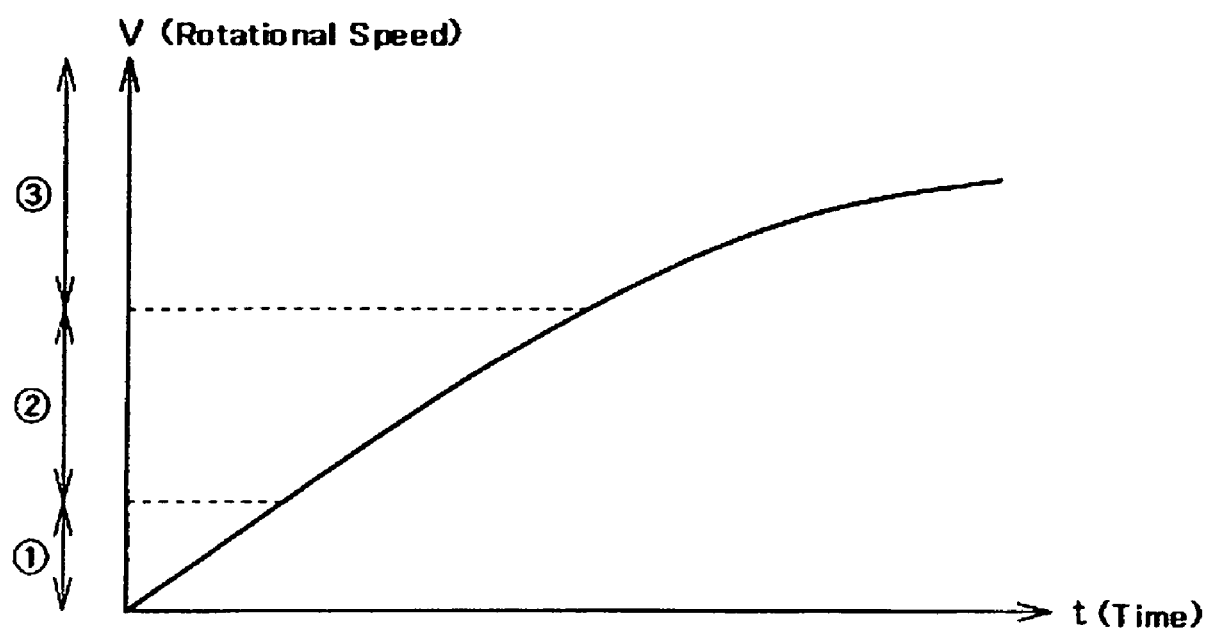
FIG. 6 is a graph showing an example of the change over time of the rotational speed of a spindle motor during spinup.

FIG. 6 shows a graph representing an example of the change over time of the rotational speed of the spindle motor SPM during spinup. The status of the drive signal applied to the spindle motor SPM is switched in response to first, second and third operating conditions. A description will be made below of the switching of the drive signal status in each of the operating conditions.

A first operating condition spans from when the magnetic recording disk 6 begins to rotate from a standstill to when the spindle motor SPM reaches a predetermined number of revolutions. Here, control (e.g., 120° conduction square wave drive in three-phase motor) is performed in which the drive signal, adapted to rotate the rotor by a predetermined amount, is switched successively in response to the rotor position while detecting the rotor position from the counter electromotive voltage. This control is terminated when the drive signal is switched a predetermined number of times.

Figure 7:
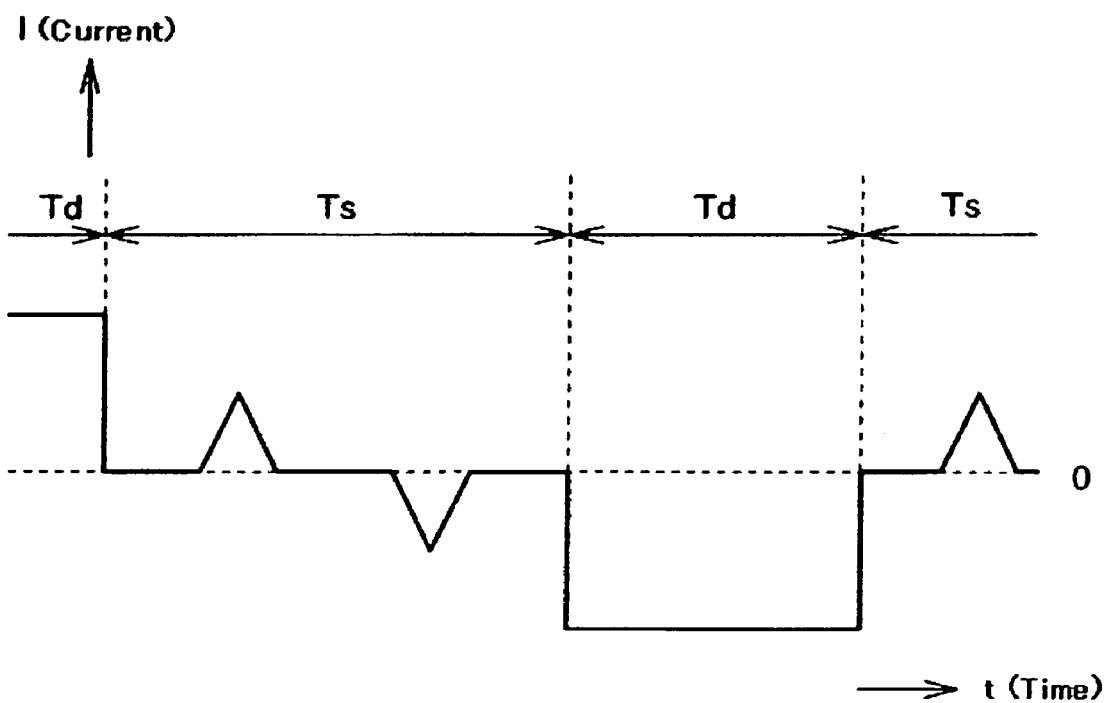
FIG. 7 is an explanatory view of a drive signal switching in a first operating condition.
Figure 7:
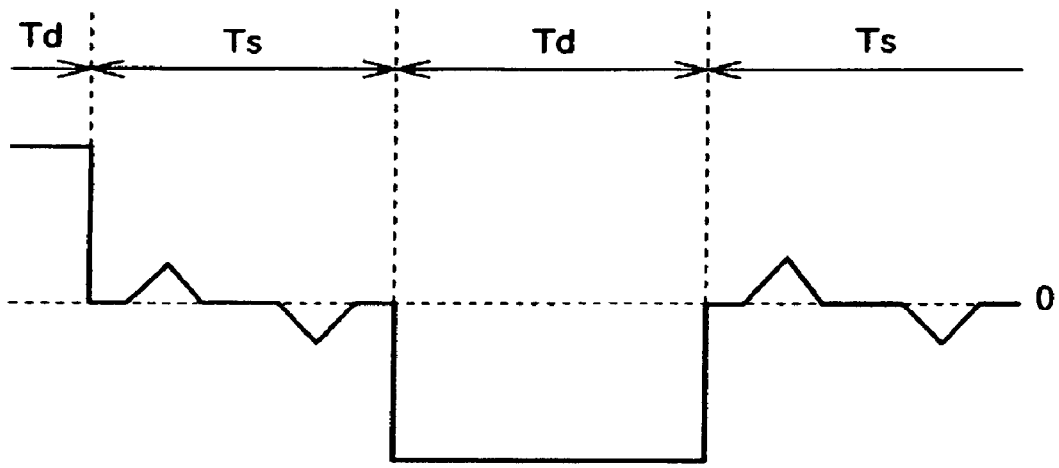

In the first operating condition, the vibration of the enclosure 2 is reduced by reducing the current level of the drive signal. FIG. 7 shows an explanatory view of the drive signal switching in the first operating condition. More specifically, a position detection phase Ts, adapted to detect the rotor position, and a current supply phase Td, adapted to impart a torque to the rotor, appear alternately in the drive signal in the first operating condition. FIG. 7 shows an outline of the drive signal applied to one of a plurality of phases (e.g., phases U, V and W) of the spindle motor SPM. The position detection phase Ts has projecting parts where current conduction takes place with other phases for detection of the counter electromotive voltage. That is, in the position detection phase Ts, a current is caused to flow between certain phases (e.g., phases U and V) so as to detect the rotor position based on the counter electromotive voltage appearing between the remaining phase (e.g., phase W) and the center tap (neutral point). Therefore, the processing unit 71A reduces the duration of the position detection phase Ts to reduce the current flows (projecting parts) adapted to detect the counter electromotive voltage, thus reducing the current level of the drive signal. Alternatively, the current level of the drive signal output from the driver 72 may be reduced by reducing the current setting of the driver 72 in the current supply phase Td.

Figure 8:
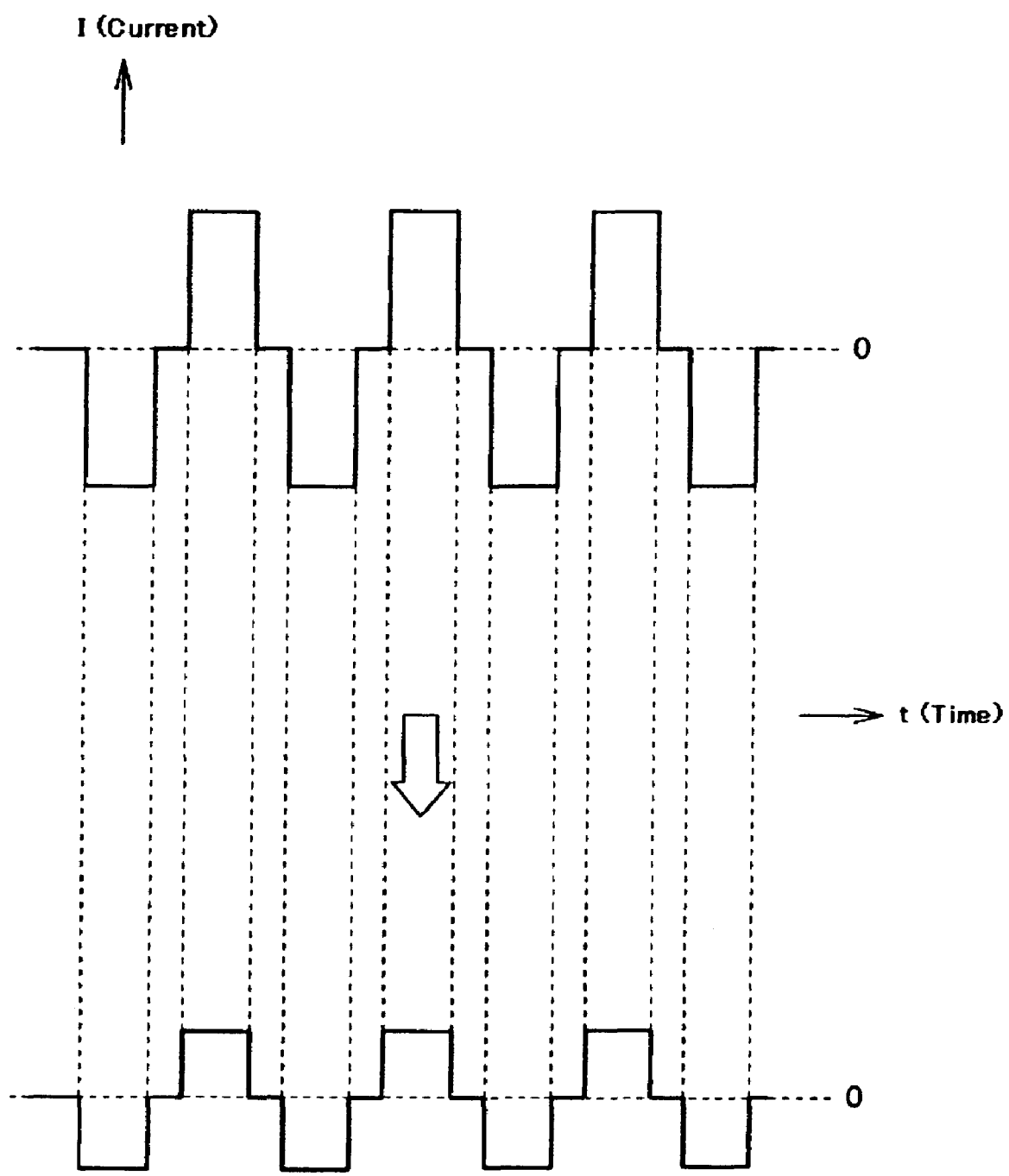
FIG. 8 is an explanatory view of the drive signal switching in a second operating condition.

A second operating condition spans from after the first operating condition to when the spindle motor SPM reaches a predetermined rotational speed. Here, the frequency is gradually increased to increase the rotor to high rotational speed. In the second operating condition, the vibration of the enclosure 2 is reduced by reducing the current level of the drive signal. FIG. 8 shows an explanatory view of the drive signal switching in the second operating condition. More specifically, the processing unit 71A reduces the current setting of the driver 72 in the second operating condition, thus reducing the current level of the drive signal output from the driver 72. Alternatively, quieter spinup may be achieved by reducing the duty ratio (ratio of non-zero amplitude time to total time) of the drive signal and thereby reducing the total current.

Figure 9:
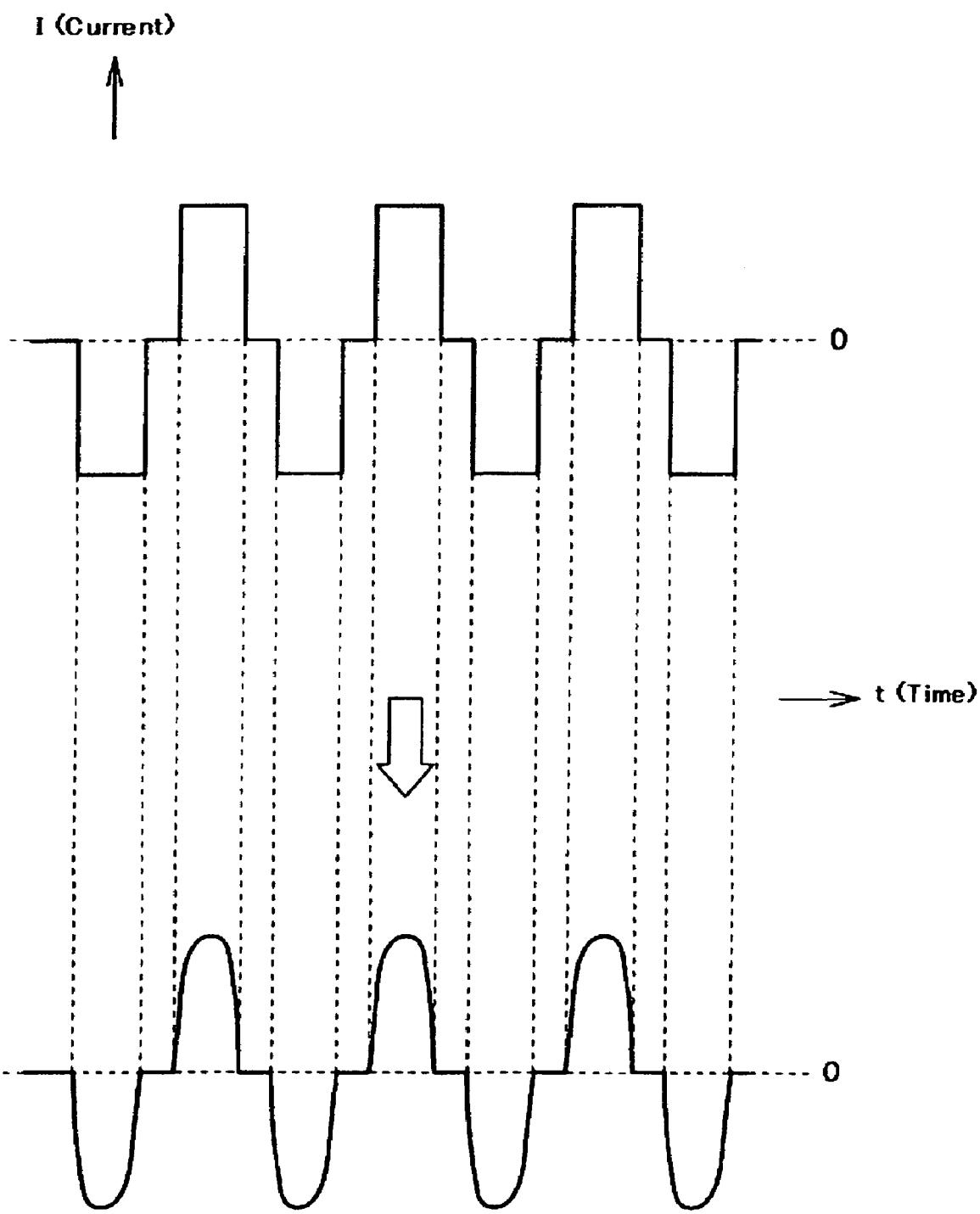
FIG. 9 is an explanatory view of the drive signal switching in a third operating condition.
Figure 1:
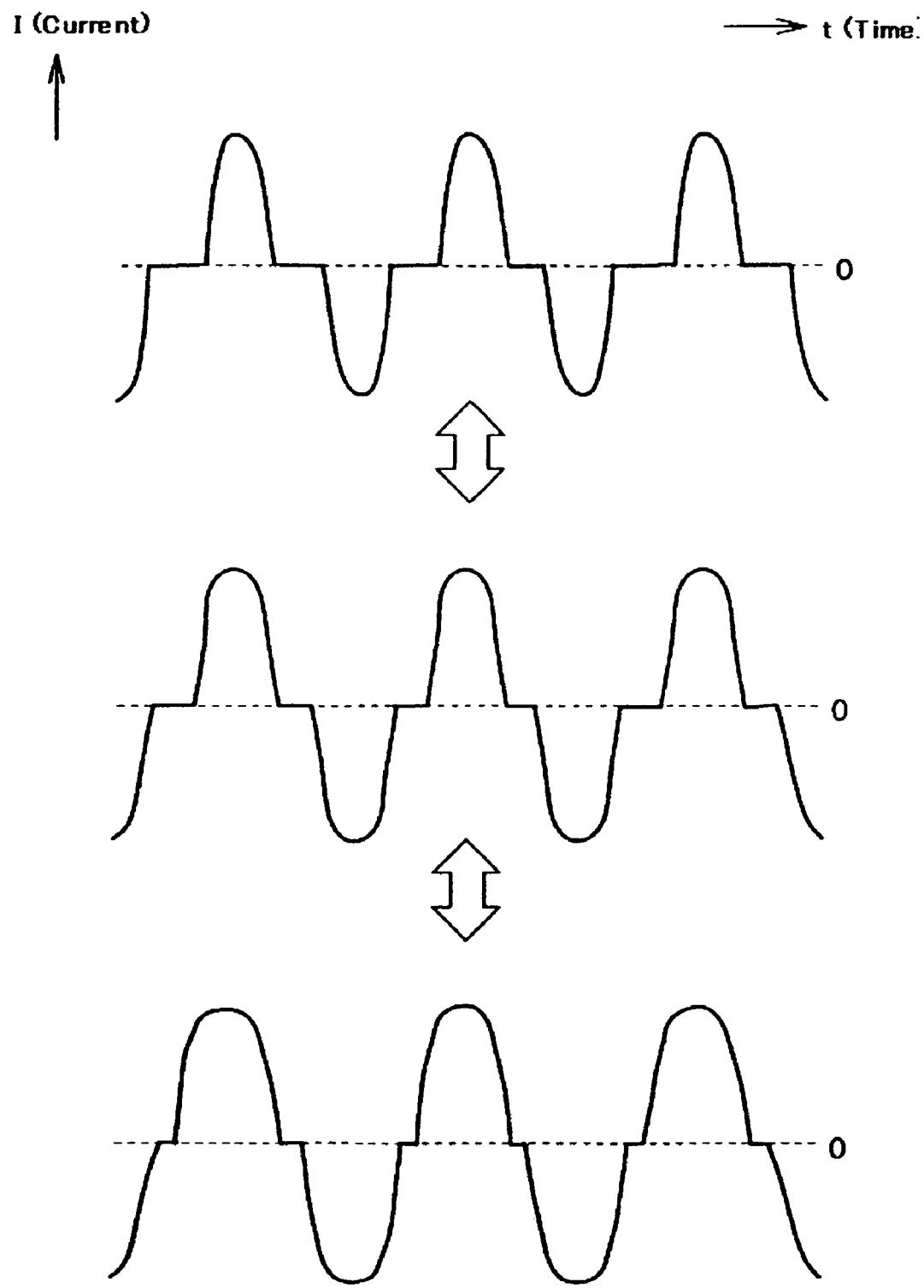
Figure 1:
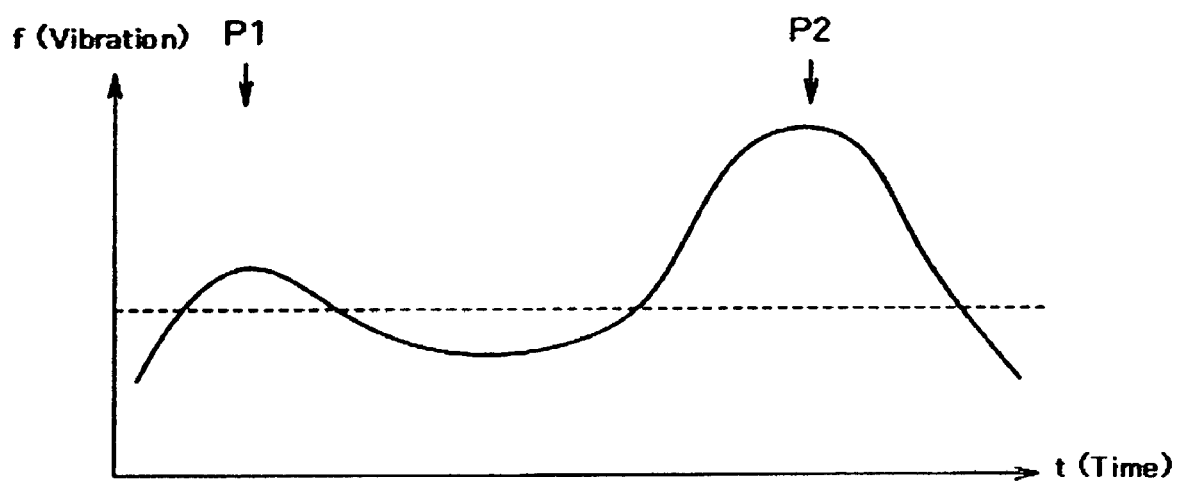

A third operating condition spans from after the second operating condition to when the spinup is complete. Here, the frequency is gradually increased to increase the rotor to high rotational speed, as is done in the second operating condition. In the third operating condition, the vibration of the enclosure 2 is reduced by smoothing the waveform of the drive signal. FIG. 9 shows an explanatory view of the drive signal switching in the third operating condition. More specifically, the processing unit 71A switches the drive signal output from the driver 72 from hard switching (square wave drive signal) to soft switching (sine wave drive signal) in the third operating condition, thus smoothing the waveform. Alternatively, a smoothed square wave with rounded corners may be used as the drive signal waveform in soft switching.

Here, the drive signal status is switched differently between the second and third operating conditions. The reason for this is that if the drive signal is switched to soft switching while the rotational speed is still low, sufficiently stable control will not be achieved. It is to be noted that the transition from the second to third operating conditions takes place when the processing unit 71A detects, based on the phase information from the driver 72, that the rotor has reached a predetermined rotational speed.

The drive signal, whose status has been switched as described above, is restored to its previous status when a predetermined time elapses or when the vibration of the enclosure 2 falls below a predetermined level. This allows for proper reduction of the vibration of the enclosure 2 if the vibration becomes increasingly larger. Alternatively, spinup may be continued with the drive signal left switched. This ensures stable spinup without having to switch the drive signal status a number of times if the vibration of the enclosure 2 becomes larger frequently.

It is to be noted that there may be a plurality of levels of the drive signal status to be switched. For example, the extent to which to reduce the drive signal current level or smooth the waveform can be changed according to the detected level of vibration of the enclosure 2. Alternatively, the extent to which to reduce the drive signal current level or smooth the waveform may also be changed in a step-by-step manner each time the vibration of the enclosure 2 reaches a predetermined level or higher. These arrangements make it possible to properly change the extent to which to reduce the vibration of the enclosure 2 in accordance with the level of vibration. These arrangements can be implemented by storing a table containing a plurality of drive signal parameters in the memory 73 and causing the processing unit 71A to select an appropriate parameter from the table.

More specifically, the vibration of the enclosure 2 can be further reduced in the first operating condition by reducing the duration of the position detection phase Ts or the current setting of the current supply phase Td in a step-by-step manner. Further in the second operating condition, the vibration of the enclosure 2 can be further reduced by reducing the current setting in a step-by-step manner. Still further, in the third operating condition, the vibration of the enclosure 2 can be further reduced by reducing the slope of the rising edge of the sine wave (region where amplitude rises from zero) as shown in FIG. 10. To reduce the slope, the period of time during which the amplitude is zero is reduced in a step-by-step manner, for example, so as to make the waveform closer to a sine wave with minimal discontinuity for detection of the counter electromotive voltage.

Second Embodiment

Figure 4:
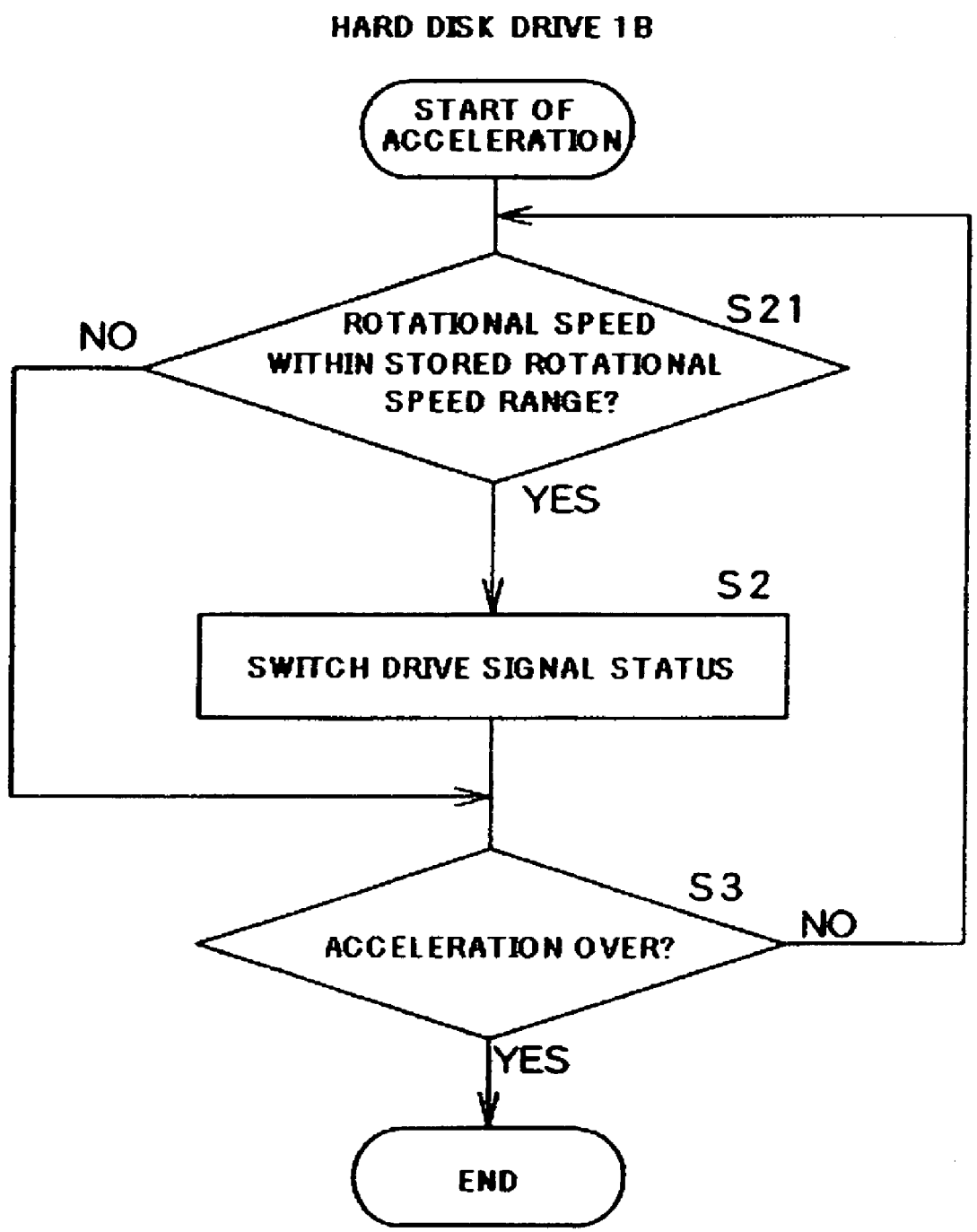
FIG. 4 is a flowchart showing the operation of the hard disk drive according to another embodiment of the present invention.

FIG. 4 shows a flowchart representing the operation of the hard disk drive 1B of the second embodiment. It is to be noted that the same steps as those in the first embodiment are denoted with the same reference numerals for omission of detailed description. The processing unit 71B of the control device 7B switches the status of the drive signal applied to the spindle motor SPM so as to reduce the vibration of the enclosure 2 (S2) if the rotational speed of the spindle motor falls within the rotational speed range causing a predetermined level of vibration or higher in the enclosure 2 (S21: YES).

The processing unit 71B of the control device 7B monitors the rotational speed of the spindle motor SPM based on the signal detected from the motor by the driver 72. In Step S21, therefore, the processing unit 71B determines whether the monitored current rotational speed falls within the range causing a predetermined level of vibration or higher in the enclosure 2.

The memory 73 (storage device) of the control device 7B stores in advance the rotational speed range causing a predetermined level of vibration or higher in the enclosure 2.

The rotational speed range can be found through measurement of the vibration of the enclosure 2 during spinup and stored in the memory 73, for example, in the manufacturing process.

Alternatively, the rotational speed range stored in the memory 73 may be rewritable. In this case, the rotational speed range in the memory 73 is updated if the processing unit 71B detects a predetermined level of vibration or higher in the enclosure 2 during spinup. This ensures reduced vibration of the enclosure 2 during a next spinup onward.

Here, the vibration of the enclosure 2 can be detected by the driver 72 (detecting device) monitoring the counter electromotive voltage generated in the voice coil motor VCM, as described above.

The status of the drive signal applied to the spindle motor SPM in Step S2 can be switched as described above. That is, the status can be switched by reducing the signal current level or smoothing the waveform.

Third Embodiment

Figure 5:
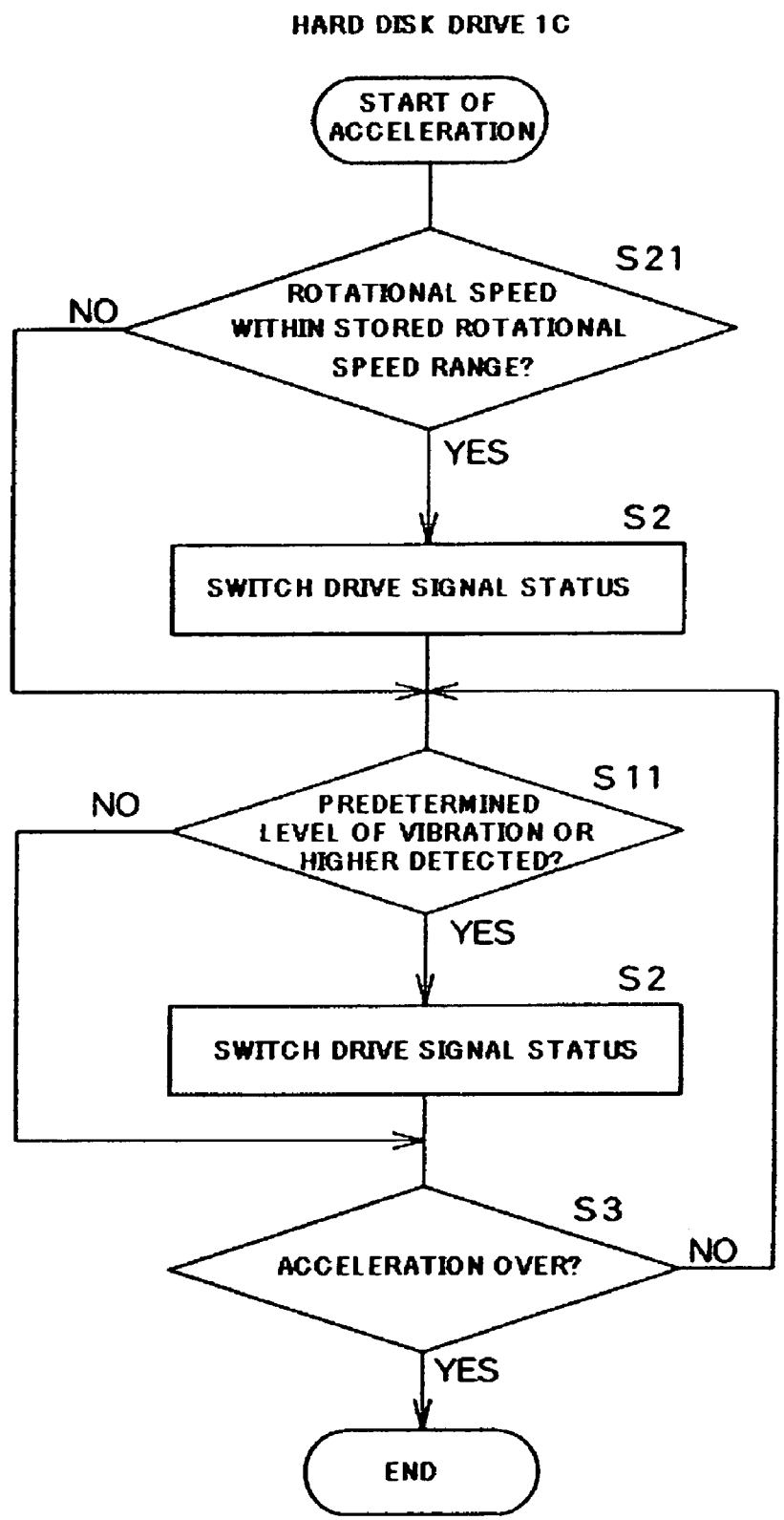
FIG. 5 is a flowchart showing the operation of the hard disk drive according to another embodiment of the present invention.

FIG. 5 shows a flowchart representing the operation of the hard disk drive 1C of the third embodiment. It is to be noted that the same steps as those in the first embodiment are denoted with the same reference numerals for omission of detailed description. The processing unit 71C of the control device 7C switches the status of the drive signal applied to the spindle motor SPM so as to reduce the vibration of the enclosure 2 (S2) if the rotational speed of the spindle motor falls within the rotational speed range causing a predetermined level of vibration or higher in the enclosure 2 (S21: YES). Then if the processing unit 71C detects via the driver 72 a predetermined level of vibration or higher in the enclosure 2 (S11: YES), the processing unit switches the status of the drive signal applied to the spindle motor SPM so as to reduce the vibration of the enclosure 2 (S2).

That is, in the presence of a predetermined level of initial vibration or higher during spinup, the processing unit 71C of the control device 7C switches the status of the drive signal based on the vibration level during the past spinups as in the second embodiment. In the presence of vibrations of a predetermined level or higher occurring thereafter, the processing unit 71C switches the drive signal based on the detected vibration level as in the first embodiment.

As shown in FIG. 11, spinup noise becomes problematic primarily when the magnetic recording disk 6 begins to rotate from a standstill (near P1) and when the vibration caused by the rotation of the spindle motor SPM produces a structural resonance in the enclosure 2 (near P2). The aforementioned control by the processing unit 71C of the control device 7C ensures switching of the control signal status based on the vibration level during the past spinups in the presence of a vibration near P1. Further, the control ensures switching of the control signal status based on the detected vibration level in the presence of a vibration near P2 (assuming that a threshold value is set near the dashed line in the graph).

According to this arrangement, the vibration, caused by the rotation of the spindle motor SPM, that produces a structural resonance in the enclosure 2 (vibration near P2), occurs in different rotational speed ranges depending on the surrounding conditions, including when the disk drive is secured in place. Therefore, the drive signal status is switched when the detected vibration level reaches a predetermined level or higher. This ensures proper reduction of the vibration even if the rotational speed range changes in which the vibration producing a structural resonance occurs.

In contrast, the vibration, generated when the magnetic recording disk 6 begins to rotate from a standstill (vibration near P1), occurs more or less at the same rotational speed and timing. Therefore, the drive signal status is switched in the rotational speed range in which the vibration of the enclosure 2 reaches a predetermined level or higher during the past spinups. This ensures stable reduction of the vibration in the initial stage of rotation for extended periods.

What is claimed is:

1. A disk drive comprising:
a spindle motor adapted to rotate a recording disk;
a detecting device adapted to detect the vibration of an enclosure; and
spindle motor so as to reduce the vibration of the enclosure if the detecting device detects a predetermined level of vibration or higher during the rotational acceleration of the recording disk,
wherein the detecting device detects the vibration of the enclosure by monitoring a counter electromotive voltage generated in a motor different from the spindle motor included in the enclosure.

2. The disk drive of claim 1, wherein
the control device reduces the current level of the drive signal applied to the spindle motor.

3. The disk drive of claim 1, wherein
the control device smoothes the waveform of the drive signal applied to the spindle motor.

4. A disk drive comprising:
a spindle motor adapted to rotate a recording disk;
a detecting device adapted to detect the vibration of an enclosure;
a storage device adapted to store a rotational speed range causing a predetermined level of vibration or higher in the enclosure; and
a control device adapted to switch the status of a drive signal applied to the spindle motor so as to reduce the vibration of the enclosure if the rotational speed of the spindle motor falls within the rotational speed range during the rotational acceleration of the recording disk,
wherein the detecting device detects the vibration of the enclosure by monitoring a counter electromotive voltage generated in a motor different from the spindle motor included in the enclosure.

5. The disk drive of claim 4, wherein
the rotational speed range stored in the storage device is updated if the detecting device detects a predetermined level of vibration or higher.

* * * * *